(12) United States Patent
Vigild et al.

(10) Patent No.: US 12,163,793 B2
(45) Date of Patent: Dec. 10, 2024

(54) METHODS AND APPARATUS FOR ASCERTAINING A DRIVING ROUTE FOR A MOTOR VEHICLE

(71) Applicant: FORD GLOBAL TECHNOLOGIES, LLC, Dearborn, MI (US)

(72) Inventors: Christian Winge Vigild, Aldenhoven (DE); Eduardo Perez Guzman, Aachen (DE); Frederik De Smet, Zonhoven (BE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 17/209,311

(22) Filed: Mar. 23, 2021

(65) Prior Publication Data
US 2021/0293557 A1  Sep. 23, 2021

(30) Foreign Application Priority Data

Mar. 23, 2020 (DE) .......................... 102020107916.8

(51) Int. Cl.
*G01C 21/34* (2006.01)
(52) U.S. Cl.
CPC ..... *G01C 21/3469* (2013.01); *G01C 21/3446* (2013.01); *G01C 21/3492* (2013.01)
(58) Field of Classification Search
CPC ......... G05D 1/0088; G05D 2201/0213; G05D 1/0246; G05D 1/0212; G05D 1/0274; G05D 1/0287; G05D 1/0278; G05D 1/0221; G05D 1/0219; G05D 1/0214; G05D 1/0251; G05D 1/0253; G05D 1/0231; G05D 1/0011; G05D 1/0022; G05D 1/0094; G05D 1/024;
(Continued)

(56) References Cited

U.S. PATENT DOCUMENTS

| 8,478,642 B2 | 7/2013 | Dey et al. |
| 2010/0131148 A1 | 5/2010 | Camhi et al. |

(Continued)

FOREIGN PATENT DOCUMENTS

| CN | 106971194 A | 7/2017 |
| CN | 106935027 B * | 7/2020 |

(Continued)

OTHER PUBLICATIONS

Search Report DE 10 2020 107 916.8, dated Feb. 8, 2021; 6 pages.

*Primary Examiner* — B M M Hannan
(74) *Attorney, Agent, or Firm* — Joseph Zane; Brooks Kushman P.C.

(57) ABSTRACT

A method for predicting travel of a vehicle includes determining a prediction starting location and a plurality of prediction destinations including a plurality of possible intersections within a boundary at a predefined distance from the starting location. The method also includes determining, for each destination, at least one route to the destination, resulting in a plurality of routes at least one of which corresponds to each destination, including determining a statistical likelihood of the vehicle remaining on an intersection-exit that is along a potential route and selecting at least one route to each destination with the highest statistical likelihood. Responsive to the vehicle no longer being on a selected route, selecting at least one new route to the at least one destination.

16 Claims, 4 Drawing Sheets

(58) Field of Classification Search
CPC .......... G05D 2201/0212; G05D 1/021; B60W 2420/42; B60W 2555/60; B60W 2710/18; B60W 60/0015; B60W 2710/20; B60W 2720/10; B60W 30/0956; B60W 10/20; B60W 30/09; B60W 40/06; B60W 2420/52; B60W 2554/00; B60W 30/18; B60W 30/10; B60W 2554/20; B60W 10/18; B60W 30/18163; B60W 2554/40; B60W 30/14; B60W 2554/60; B60W 2552/00; B60W 50/14; B60W 10/04; B60W 2520/10; B60W 2554/80; B60W 2555/20; B60W 30/12; B60W 60/001; B60W 60/0027; B60W 30/18154; B60W 40/04; B60W 2554/801; B60W 30/0953; B60W 2554/4041; B60W 30/16; B60W 2556/50; B60W 2556/10; B60W 40/105; B60W 50/082; B60W 60/00274; B60W 2554/804; B60W 60/0011; B60W 2554/402; B60W 2556/45; B60W 2050/143; B60W 2510/18; B60W 2552/53; B60W 2050/0031; B60W 2754/20; B60W 2754/30; B60W 50/0097; B60W 2050/146; B60W 2520/105; B60W 30/095; B60W 30/181; B60W 50/12; B60W 60/00272; B60W 10/06; B60W 2556/40; B60W 2554/4029; B60W 2554/4046; B60W 30/143; B60W 2400/00; B60W 50/087; B60W 30/06; B60W 30/08; B60W 30/165; B60W 2554/4045; B60W 2554/4042; B60W 2556/65; B60W 40/08; B60W 60/0025; B60W 10/184; B60W 2050/0075; B60W 30/00; B60W 50/0098; B60W 60/0016; B60W 2540/26; B60W 2554/4043; B60W 2554/4044; B60W 2720/24; B60W 40/09; B60W 60/00253; B60W 2556/60; B60W 30/18159; B60W 40/02; B60W 50/16; B60W 10/10; B60W 2300/10; B60W 2552/30; B60W 2720/106; B60W 50/0205; B60W 50/029; B60W 50/08; B60W 2050/0292; B60W 2520/12; B60W 2552/05; B60W 2552/10; B60W 2554/802; B60W 40/00; B60W 2554/4048; B60W 30/18145; B60W 60/0017; B60W 60/0051; B60W 2040/0809; B60W 2520/14; B60W 2554/4026; B60W 2554/806; B60W 2720/103; B60W 30/146; B60W 60/0013; B60W 2520/125; B60W 2530/201; B60W 2540/18; B60W 2540/215; B60W 2552/45; B60W 2554/4049; B60W 2555/00; B60W 2556/00; G01C 21/3446; G01C 21/3492; G01C 21/3415; G01C 21/3617; G01C 21/343; G01C 21/3469
USPC .................................................. 701/423, 467
See application file for complete search history.

(56) References Cited

U.S. PATENT DOCUMENTS

| | | | |
|---|---|---|---|
| 2013/0046457 A1* | 2/2013 | Pettersson | G01C 21/34 701/1 |
| 2016/0069695 A1* | 3/2016 | Broadbent | G01C 21/3694 701/411 |
| 2017/0241794 A1* | 8/2017 | Koo | G08G 1/09623 |
| 2017/0328720 A1 | 11/2017 | Manoliu et al. | |
| 2018/0348010 A1* | 12/2018 | Coleman | G01C 21/3889 |
| 2019/0033084 A1* | 1/2019 | Chen | G01C 21/362 |
| 2019/0093538 A1* | 3/2019 | Szczepanski | F01N 3/023 |
| 2019/0293443 A1* | 9/2019 | Kelly | G01C 21/3484 |
| 2019/0346275 A1* | 11/2019 | Kelly | G01C 21/3415 |
| 2021/0010824 A1* | 1/2021 | Muraleev | G08G 1/143 |

FOREIGN PATENT DOCUMENTS

| | | | | |
|---|---|---|---|---|
| CN | 117253363 A | * | 12/2023 | |
| DE | 102018000596 A1 | | 8/2018 | |
| EP | 3371799 A1 | | 9/2018 | |
| FR | 2740594 A1 | * | 4/1997 | .......... G01C 21/3446 |
| GB | 2556876 A | * | 6/2018 | .......... G01C 21/3415 |
| GB | 2560487 A | * | 9/2018 | .......... G01C 21/3415 |
| KR | 20170083233 A | | 7/2017 | |
| WO | 2017076597 A1 | | 5/2017 | |
| WO | WO-2019116053 A1 | * | 6/2019 | |
| WO | WO-2020167945 A1 | * | 8/2020 | |

* cited by examiner

METHODS AND APPARATUS FOR ASCERTAINING A DRIVING ROUTE FOR A MOTOR VEHICLE

CROSS-REFERENCE TO RELATED APPLICATIONS

This application claims foreign priority benefits under 35 U.S.C. § 119(a)-(d) to DE Application 10 2020 107 916.8 filed Mar. 23, 2020, which is hereby incorporated by reference in its entirety.

TECHNICAL FIELD

The invention generally relates to a method for ascertaining a driving route for a motor vehicle between a starting location and a destination location within a driving horizon of predetermined size surrounding the starting location, wherein the driving route is formed from at least one intersection and at least three roads connected to the intersection. Moreover, the invention relates to a system for carrying out the method.

BACKGROUND

The incorporation of connectivity in current and future motor vehicles opens up immense possibilities for optimizing parameters of drive systems of the motor vehicles, in particular to reduce pollutant emissions and a fuel consumption or power consumption of a motor vehicle. However, strengthening guidelines to protect personal data has effects on an implementation of prediction behaviors for drivers which are based on connectivity schemes.

U.S. Pat. No. 8,478,642 B2 discloses a method and a device for predicting a navigation decision behavior. The location of a device is used to generate the current location of the device and a course of earlier locations of the device. A behavior prediction application predicts a driving route based on preferences of a driver and on preferred driving destinations and/or driving routes which were covered in the past. The preferences of a specific driver can be learned by the system in order to be implemented in the behavior prediction application, or they can be manually input by the driver. The system can use GPS or another positioning technology in order to determine the location of the device. The device can be a GPS-capable standard device in the automobile or another portable device such as a mobile telephone or a PDA.

US 2010/0 131 148 A1 discloses a system and a method for assessing a driver intention for control of driver assistance systems. An analysis device is provided, which receives data from a vehicle surroundings sensor, a vehicle dynamics sensor, and a driver attribute sensor, so that the analysis device makes a prediction of the driver intention based on the received data. A control device controls a vehicle and a driver partially based on the predicted driver intention.

EP 3 371 799 A1 discloses a method for determining a driving intention for a vehicle, wherein the driving intention includes information about a predicted driving maneuver. A position of the vehicle is determined and a road section is ascertained based on the position of the vehicle and a digital map, wherein one or more possible driving intentions are associated with the road section and wherein one or more trigger conditions based on one or more trigger variables are assigned to the one or more possible driving intentions. Information is obtained about internal trigger variables for the determination of a current driving intention, based on onboard sensors or actuators of the vehicle. The driving intention is determined based on the road section, the information about the internal trigger variables, and the one or more trigger conditions.

CN 106 971 194 A discloses a driving desire identification method, including classifying driving intentions of drivers, dividing the driving intentions of the driver into five categories, namely emergency lane change to the left, normal lane change to the left, keeping the lane, normal lane change to the right, and emergency lane change to the right. Furthermore, the method comprises acquiring and processing experimental data, off-line training of an algorithm, and identifying the driving intentions of the driver. According to the method, a human-vehicle road system is completely taken into consideration, items of information from vehicles, roads, and drivers are acquired, the algorithm is used, and the accuracy and the up-to-dateness of a driving lane change intention identification model are improved.

KR 2017/0 083 233 A discloses a driver assistance system which uses a map-based determination of the movement intention of moving objects. The driver assistance system includes a sensor unit having a distance measuring sensor and a GPS for obtaining items of information about moving objects around a vehicle. Moreover, the driver assistance system includes a map information collection unit for collecting maps which are to be used for driving from a storage device, and a movement object information measuring unit for acquiring items of status information of surrounding moving objects by way of a surroundings sensor installed on the vehicle, a vehicle status measuring unit for acquiring items of status information of the ego vehicle, and a movement object intention determination unit.

SUMMARY

The illustrative embodiments and the like provide a method for ascertaining a driving route for a motor vehicle which manages without an evaluation of individual items of driver information.

This may be achieved by a method, according to which at least two change probabilities, which each stand for one change of the motor vehicle at the intersection from one of the roads into one of the two further roads, are ascertained on the basis of previously acquired fleet data and the intersection is assigned a change matrix containing the change probabilities, wherein the driving route is ascertained in consideration of the change matrix.

It is to be noted that the features and measures set forth individually in the following description can be combined with one another in any technically reasonable way and disclose further embodiments of the invention. The description additionally characterizes and specifies the illustrative, non-limiting embodiments in particular in conjunction with the figures.

According to the invention, the driving route is not ascertained based on personal data, which are obtained, for example, from learning a driving route or a behavior of a driver, but rather may be completely detached from any reference to an individual driver behavior, an individual intention, or another type of reference to a driver. This differentiatesfrom the prior art cited at the outset, since depersonalized data are obtained using the method according to the invention, which enable a macroscopic representation of the knowledge (as a representation of the fleet) on a higher level in a database, for example a data cloud, in contrast to the microscopic representation described in the prior art cited at the outset, which is focused on one driver or a series of drivers who drive a vehicle and thus requires sensitive personal data.

In addition, the acquired data can be transmitted in blocks to the database and randomized at random intervals, so that there is no possibility of reconstructing the sequence of the data production. This is also distinguished from to the methods described in the prior art cited at the outset, which are based on learning a sequence of how data are generated in order to generate patterns for a prediction algorithm.

A prediction algorithm can be used which is based on solely (if desired) statistical items of information (fleet data), without learning or extracting a behavior of a specific driver from the data. Since no learning of a behavior of a specific driver takes place, the prediction algorithm operates iteratively based on the actual actions of the driver, wherein the prediction algorithm can update waypoints in the driving horizon. This is a further difference from the prior art, since driving final destinations are not predicted, but rather parts of a driving path, namely the waypoints, may be. As soon as the driver approaches the edge of the prediction horizon, a new horizon can be ascertained. Moreover, a new driving route can then be ascertained. This process can be stopped when the motor vehicle is switched off after a drive. Storing or learning of the events may not be then carried out.

A prediction method for improving the optimization of the behavior of a drive system of a motor vehicle can thus be provided, wherein the method consists of observing the fleet behavior in order to produce reasonable predictions. The method enables a production of an array of possible destinations WPx of a driver not as driving final destinations, but rather as driving horizons H(WPx), which enable planning of control strategies for drive systems of motor vehicles. This enables the prediction of the intention of a driver without using personal data, and the use of this prediction for producing drive tracks for assisting planning of drive control strategies. The planning includes, for example, the control of drivetrain functions such as the regeneration of the particle filter in diesel engines. In this case, it is expedient to use the prediction of the intention of a driver to identify optimum points or routes within the driving horizon at which a regeneration of the particle filter is to be triggered or carried out. In the case in which no optimum points or routes take place, i.e., are identifiable, within the presently travelled driving horizon, the condition of the particle filter (for example, soot load, time of the last successful regeneration) is checked, so that it can be decided whether a suboptimal point is to be used for regeneration, or whether one can or may wait for a new prediction within a new driving horizon. A further example can be seen in diesel engines having LNT (lean NOx trap), in which an adaptation of the flushing strategy of the LNT is to be carried out on the basis of the prediction of the intention of a driver, with the goal of optimizing the NOx conversion-fuel consumption ratio in the LNT. The use of the prediction of the intention of a driver is, of course, not restricted to the mentioned examples, i.e., for diesel engines or internal combustion engines. In electric vehicles having range extenders (REEV), for example, better planning enables the charging strategy of the battery to be optimally adapted with assistance of the internal combustion engine. For example, points or routes outside environmental zones and/or having suitable velocity profile within the driving horizon can be identified as optimum points or routes for the charging of the battery assisted on the part of the internal combustion engine.

In a higher data level, which is a base level of the separately arranged database, for example data cloud, the items of information stored therein can solely be counts of actions of motor vehicles at an intersection, wherein only an indication of a motor vehicle type which carried out this action is stored. The action of the motor vehicle at the intersection is given in the form "coming from route section A—taking route section B" and is stored in the form of a conditional probability in a graph database of the higher data level. Further items of information which can be stored in the database can relate to the way in which a route section is travelled, including drive parameters, such as velocity, gear change, emissions, power consumption, etc. These items of information may also not linked to personal data and may only relate to a motor vehicle type.

The illustrative embodiments may use a graph database in order to assign items of information (data) for the prediction method. Moreover, the embodiments include a prediction method for assessing the intention of a driver, which may be based on solely statistical items of fleet information and no items of individual driver information and which uses the query algorithms given by the database topology.

According to one embodiment, roads and intersections present between the starting location and the destination location is ascertained from geographic data.

A further embodiment provides that after a passing of the intersection it is ascertained whether or not the motor vehicle is located on the ascertained driving route, and a new driving route is ascertained if the motor vehicle is no longer located on the ascertained driving route. If the motor vehicle is no longer located on the ascertained driving route, a new set of driving routes to waypoints can be calculated and the probabilities of waypoints can be updated, in order to determine a new most probable waypoint.

The above may be achieved by a system which includes a fleet made up of motor vehicles and at least one separately arranged database connectable to the motor vehicles.

Further embodiments of the inventions are disclosed in the dependent claims and the following description of the figures. In the figures

DETAILED DESCRIPTION

As required, detailed embodiments of the invention are disclosed herein; however, it is to be understood that the disclosed embodiments are merely exemplary of the invention that may be embodied in various and alternative forms.

The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
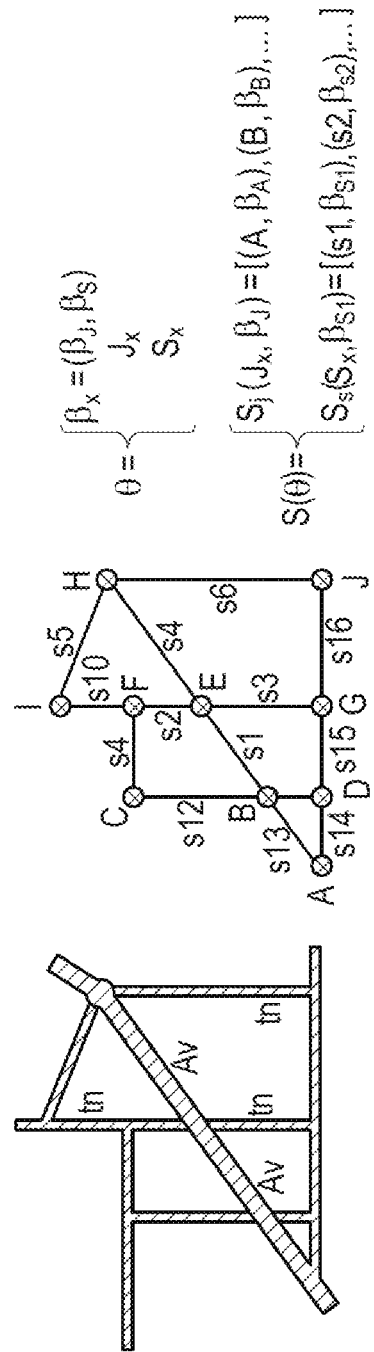
FIG. 1 shows a schematic illustration of an exemplary embodiment for a geographic region, a graphic structure, and its description.

FIG. 1 shows a schematic illustration of an exemplary embodiment for a geographic region (left in FIG. 1), a graphic structure S(θ) (middle of FIG. 1), and its description (right in FIG. 1). The database structure may be a cloud implementation of a graph database, in which a data channel is activatable to exchange items of information between a motor vehicle and the database structure. This database structure can be mapped in a multilayered implementation in a control unit of the motor vehicle or a portable computer (PDA) of a driver of the motor vehicle.

The basic structure of the database is a geographic region, which is shown on the left in FIG. 1, and which is mapped in a graphic structure S(θ) shown in the middle of FIG. 1, which is described, inter alia, by parameters $\beta_x$, as shown on the right in FIG. 1. The structure S(θ) includes two topological elements which form the graphic grid, namely intersections $J_x$, i.e., points which connect the roads, and roads $s_x$, wherein the term "road" is understood as any drivable path between two intersections. Moreover, the basic structure S(θ) includes the description parameters $\beta_x$, which describe intersections, roads, and their interactions physically and with respect to behavior. Examples of such parameters are geographic coordinates, a driving direction, a vehicle density, a (possible) average velocity, average emissions, a power consumption, pollutant emissions, and other relevant values.

Derived change matrices $P(J_x)$ are linked to the structure S(θ), which describe the transitions between one road and another road via an intersection. The change matrices, the elements of which are conditional probabilities, as described in the following table:

| $P(J_x)$ | $s_{x1}$ | $s_{x2}$ | $s_{x3}$ | ... | $s_{xn}$ |
|---|---|---|---|---|---|
| $s_{x1}$ | $s_{x1}\|s_{x1}$ | $s_{x1}\|s_{x2}$ | $s_{x1}\|s_{x3}$ | ... | $s_{x1}\|s_{xn}$ |
| $s_{x2}$ | $s_{x2}\|s_{x1}$ | $s_{x2}\|s_{x2}$ | $s_{x2}\|s_{x3}$ | ... | $s_{x2}\|s_{xn}$ |
| $s_{x3}$ | $s_{x3}\|s_{x1}$ | $s_{x3}\|s_{x2}$ | $s_{x3}\|s_{x3}$ | ... | $s_{x3}\|s_{xn}$ |
| ... | ... | ... | ... | ... | ... |
| $s_{xn}$ | $s_{xn}\|s_{x1}$ | $s_{xn}\|s_{x2}$ | $s_{xn}\|s_{x3}$ | ... | $s_{xn}\|s_{xn}$ |

Thus, for example, $P(s_{x3}|s_{x2})$ is the probability of coming from the road $s_{x2}$ and changing via the intersection $J_x$ to the road $s_{x3}$.

Moreover, derived driving routes $$R_x(\overline{J_{x\_rx}}, \overline{s_{x\_rx}})$$

are linked to the structure S(θ), which are a set of n intersections and n−1 roads, which describe a path to be driven. They are provided with a probability P of being driven on:

$$R_x(\overline{J_{x\_rx}}, \overline{s_{x\_rx}}) = [(J_{x\_rx}(1), \ldots, J_{x\_rx}(n)), (s_{x\_rx}(0), \ldots, s_{x\_rx}(n-1)), P(R_x)].$$

In this way, the database, as soon the structure of the database is established, is filled with items of information about the actions of motor vehicles at an intersection (coming from route section A—taking route section B) and some statistics about the behavior of the motor vehicle in the driven route section. These items of information do not contain personal data and have no reference to a person or a specific motor vehicle. The only reference is a motor vehicle type which supplies the data. In order to improve the anonymization, the data are transmitted to the database (cloud) and randomized at random time intervals, so that there is no sequence of how the data have been produced.

The prognosis method uses the items of information from the database in order to generate an array of probable driving routes based on fleet data and provides this result (driving routes) for further analyses. This result represents the prediction of the intention of the driver and may be estimated as follows. The basic operation is the calculation of the probability $P(s\_next_x)$, of taking a road $s\_next_x$ if one approaches an intersection $J_x$ from a road $P(s\_actual_x)$. This is represented in Equation 1:

$$P(J_x) \cdot P(s_{actual_x}) = P(s\_next_x). \qquad \text{Equation 1}$$

Due to the definition of a driving horizon ($Horizon_x$) around a starting point $s_x$, the intersections in the periphery of this driving horizon define the waypoints $WP_x$. Each set of roads and intersections from the starting point to each waypoint defines a driving route in the driving horizon.

The object thus consists of preparing driving routes which connect the starting point $s_x$ to each waypoint $WP_x$, and to apply Equation 1 in iterative form along the respective defined driving route up to the waypoint. This supplies the probability of reaching the respective waypoint which begins at $s_x$. The driver intention or prediction is then the set of driving routes, the waypoints of which have a higher probability in a certain driving horizon.

That is to say for one starting point $s_{x\_r}(0)$ and one waypoint $WP_{x1}$, which is an element of $\overline{J_{x\_r1}}$, the driving route $R_{x1}$ is defined by:

$$R_{x1} = [(J_{x\_r1}(1), \ldots, J_{x\_r1}(n)), (s_{x1}(0), \ldots, s_{x\_r1}(n-1))]$$

and $$WP_{x1} = J_{x\_r1}(n).$$

The iterative application of Equation 1 and the consideration of these elements in $\overline{s_{x1}}$ in direction $WP_{x1}$ supplies:

$$P(J_{x\_r1}(1)) \cdot P(s_{x1}(0)) = P(s_{x\_r1}(1))$$

$$P(J_{x\_r1}(2)) \cdot P(s_{x\_r1}(1)) = P(s_{x\_r1}(2))$$

$$P(J_{x\_r1}(n)) \cdot P(s_{x\_r1}(n-1)) = P(s_{x\_r1}(n))$$

and $$P(R_{x1}) = P(s_{x\_r1}(n))$$

By applying the method for each waypoint {$WP_{x1}$, $WP_{x2}$, ..., $WP_{xn}$} in the defined horizon and its corresponding driving routes {$R_{x1}$, $R_{x2}$, ..., $R_{xn}$}, the probabilities of all waypoints are calculated. As already mentioned, the prediction consists of selecting these waypoints having higher probability $P(R_x)$ and considering their driving routes $R_x$ as the probable intention of the driver.

As soon as the motor vehicle approaches the boundaries of the horizon, a new horizon is placed around the node point to be approached (one of the waypoints), and new waypoints are calculated again according to the entire method.

The method calculates the probabilities from the starting point up to each of the waypoints at the edge of the horizon. The preparation of a driving route $R_x$ to a waypoint $WP_x$ can take place in various ways. One possibility is to use the same statistical method, which is based on change matrices at intersections, in which all drivable driving routes from a starting point to a waypoint are taken into consideration and only the driving route having the highest probability of being driven is taken into consideration. The same method is then also used for ascertaining each driving route which is associated with the respective waypoint.

Other methods for determining a driving route take into consideration the items of information available in the database about the fleet behavior. For example, criteria such as minimum distance, minimum average power/fuel consumption, maximum average velocity, minimum emissions can be taken into consideration in the calculation of a driving route associated with a waypoint. These items of information are already contained in the items of information of the route sections stored in the graph database.

As already mentioned, the method is iteratively repeated in order to prepare new horizons, new waypoints, and new driving routes until the vehicle stops and is switched off. No knowledge may be stored or learned as a sequence.

The only information which is transmitted is that which is required for updating the database. This can take place in various ways, in order to ensure the anonymity. One possibility is to update the database at random time (or distance) intervals. In this case, the stored data are randomized, encrypted, and sent to the database. It is thus ensured that the sequence of the data generation is lost and it is separated from any connection to a specific driver. Once stored in the database, the data are stored in accordance with the corresponding route sections and intersections, whereby the structure is updated.

The result of the method, i.e., the prediction of the driver intention in the form of driving routes, enables the production of drive tracks for planning control strategies. By extracting the items of information from the database along a predicted driving route, it is possible to prepare tracks for emissions, fuel/power consumption, and velocity (relevant for the functionality of the exhaust gas posttreatment). At the same time, it is possible by the replication of the database to achieve a granularity of the data. For example, a time of day, a day of the week, a season improve the accuracy of the prediction of the driver intention and the prediction of the tracks.

Figure 2:
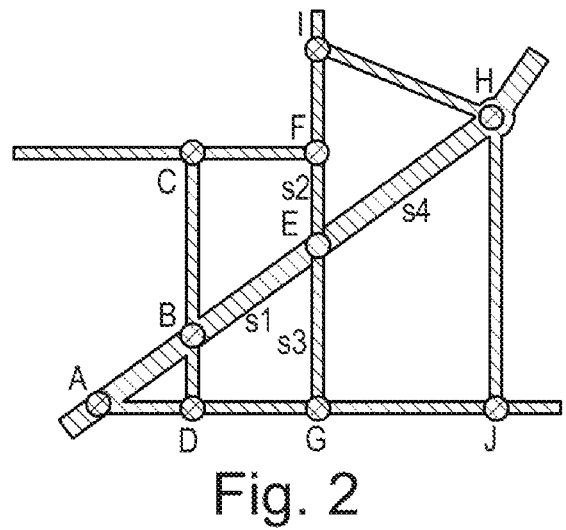
FIG. 2 shows a further schematic illustration of the graphic structure shown in FIG. 1.

The structure $S(\theta)$ shown in FIG. 2 is based on two main elements, namely intersections (A, B, . . . ) and roads (s1, s2, . . . ), and on two derived elements, namely change matrices (PA, PB, . . . ) and routes (R1, R2, . . . ) as a series of intersections and roads. The change matrices PX are defined for each intersection, based on the transitions from road to road.

For example, s3|s1 for the intersection E and the change matrix PE defines the conditional probability that a driver coming from the road s1 will take the road s3 at the intersection E. The change matrix PE has the following structure.

| PE | s1 | s2 | S3 | s4 |
|---|---|---|---|---|
| s1 | s1|s1 | s1|s2 | s1|s3 | s1|s4 |
| s2 | s2|s1 | s2|s2 | s2|s3 | s2|s4 |
| s3 | s3|s1 | s3|s2 | s3|s3 | s3|s4 |
| s4 | s4|s1 | s4|s2 | s4|s3 | s4|s4 |

Figure 3:
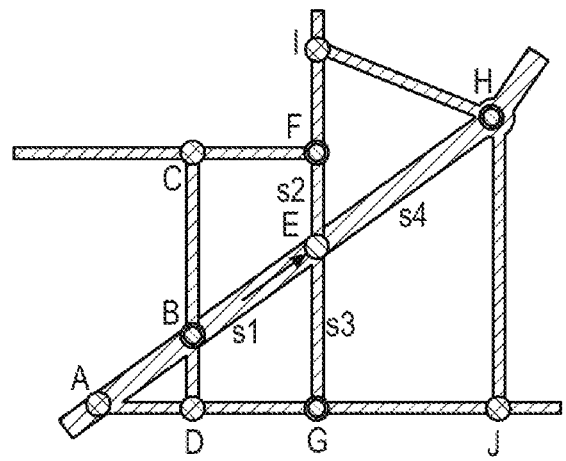
FIG. 3 shows a further schematic illustration of the graphic structure shown in FIG. 1.

Assuming a driver starts, as shown in FIG. 3, at any point of the road s1 in the direction of the intersection E and with the presence of the following change matrix PE

| PE | s1 | s2 | S3 | s4 |
|---|---|---|---|---|
| s1 | 0 | 0.6 | 0.2 | 0.6 |
| s2 | 0.3 | 0 | 0.2 | 0.2 |
| s3 | 0.2 | 0.3 | 0 | 0.2 |
| s4 | 0.5 | 0.1 | 0.6 | 0 | the probability of taking a specific road at the intersection E is defined by:

$$\begin{bmatrix} 0 & 0.6 & 0.2 & 0.6 \\ 0.3 & 0 & 0.2 & 0.2 \\ 0.2 & 0.3 & 0 & 0.2 \\ 0.5 & 0.1 & 0.6 & 0 \end{bmatrix} \begin{bmatrix} 1 \\ 0 \\ 0 \\ 0 \end{bmatrix} = \begin{bmatrix} 0 \\ 0.3 \\ 0.2 \\ 0.5 \end{bmatrix} \cdots \begin{bmatrix} P(s1) \\ P(s2) \\ P(s3) \\ P(s4) \end{bmatrix}$$

That is to say, the probability of taking the road s2 is 30%, the probability of taking the road s3 is 20%, the probability of taking the road s4 is 50%, if the probability of coming from the road s1 is 100%.

Figure 4:
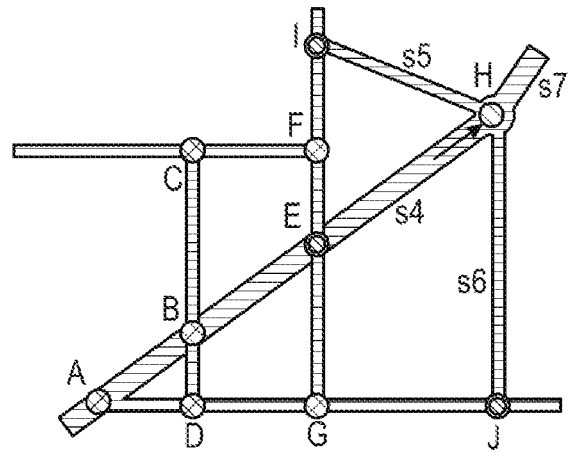
FIG. 4 shows a further schematic illustration of the graphic structure shown in FIG. 1.

After it has been ascertained after passing an intersection that the driver has made a predicted decision or has taken a predicted road at the intersection, the method is repeated up to the next intersection and the probability is calculated of taking the respective road at the next intersection. For example, the driver, as shown in FIG. 4, takes the road s4 and moves toward the intersection H with the following change matrix PH:

| PH | s4 | s5 | S6 | s7 |
|---|---|---|---|---|
| s4 | 0.1 | 0.1 | 0.4 | 0.5 |
| s5 | 0.2 | 0 | 0.2 | 0.2 |
| s6 | 0.2 | 0.2 | 0 | 0.2 |
| s7 | 0.5 | 0.7 | 0.4 | 0.1 |

In the following, the properties and functions of waypoints of a driving route and a driver horizon are discussed.

Figure 5:
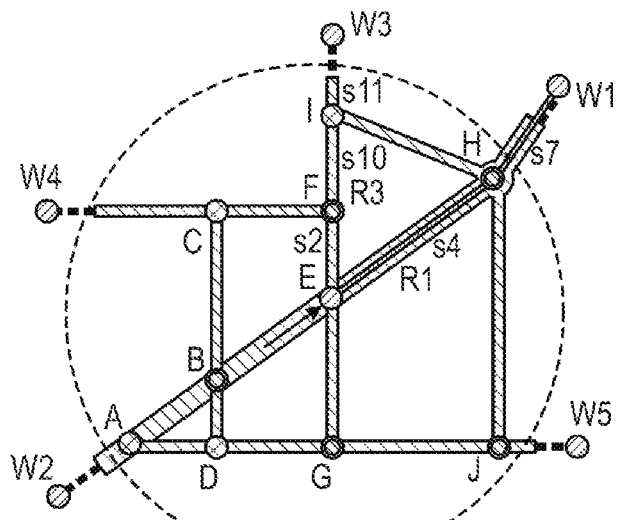
FIG. 5 shows a further schematic illustration of the graphic structure shown in FIG. 1.

If a region having a diameter of X km (or another form) is defined around a starting point at the road s1 of a drive in the direction of the intersection E, as shown in FIG. 5, an array of waypoints (W1, W2, . . . ) can be defined at the boundaries of the defined region, which describes the horizon of the driver H(Wx). The probability of reaching the waypoint is defined for each of the waypoints. Moreover, the driving properties of the driving routes (R1, R2, . . . ) to each waypoint are defined.

For example, R1 in FIG. 5 defines a driving route to the waypoint W1, which consists of the intersections E and H and the roads s4 and s7, while R3 defines a driving route to the waypoint W3, which consists of the intersections E, F, and I and the roads s2, s10, and s11.

The calculation of the probability of the waypoint W3 and the waypoint W1 is based on the above-described iterative method. For the given example, the probability of moving in the direction of the waypoint W1, beginning at the road s1 in driving direction E and following R1, is defined by:

$$\begin{bmatrix} 0.1 & 0.1 & 0.4 & 0.5 \\ 0.2 & 0 & 0.2 & 0.2 \\ 0.2 & 0.2 & 0 & 0.2 \\ 0.5 & 0.7 & 0.4 & 0.1 \end{bmatrix} \begin{bmatrix} 0.5 \\ 0 \\ 0 \\ 0 \end{bmatrix} = \begin{bmatrix} 0.05 \\ 0.1 \\ 0.1 \\ 0.25 \end{bmatrix} \cdots \begin{bmatrix} P(s4) \\ P(s5) \\ P(s6) \\ P(s7) = P(W1) \end{bmatrix}$$

The movement in the direction of the waypoint W1 has a probability of 25%. The method is to be applied to all waypoints. The process is iterative, since the items of driver information are updated, for example horizon H(Wx) is not a fixed horizon, but rather an imaginary one.

A driving route is any possible path which leads from the starting point to a waypoint, in the present case any drivable path from intersection B to the waypoints W1 to W5. For each driving route, the probabilities for reaching each waypoint W from the intersection B are calculated on the basis of statistical data from the graph database. In the construction of a driving route (from starting point to destination point), various criteria can be taken into consideration, based on the data storage in the database. For example, the following commands can be taken into consideration: construct driving routes based on a minimum distance to the waypoint or minimum pollutant emissions or minimum power consumption or maximum drivable velocity (not a prescribed velocity limit, but drivable velocity based on statistics) or on the basis of the same intersection statistic.

Figure 6:
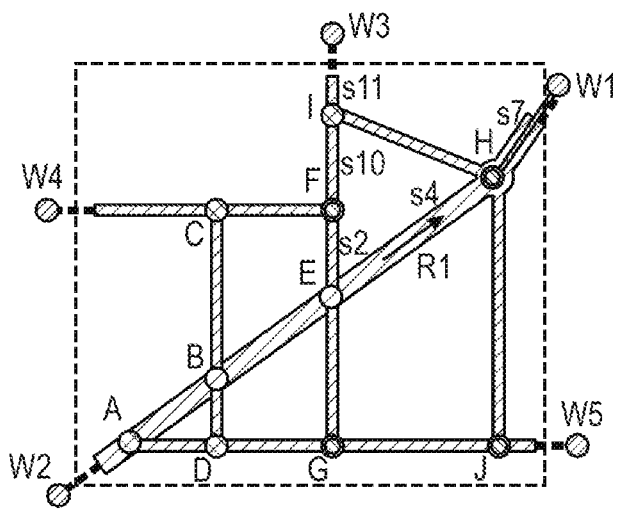
FIG. 6 shows a further schematic illustration of the graphic structure shown in FIG. 1.
Figure 7:
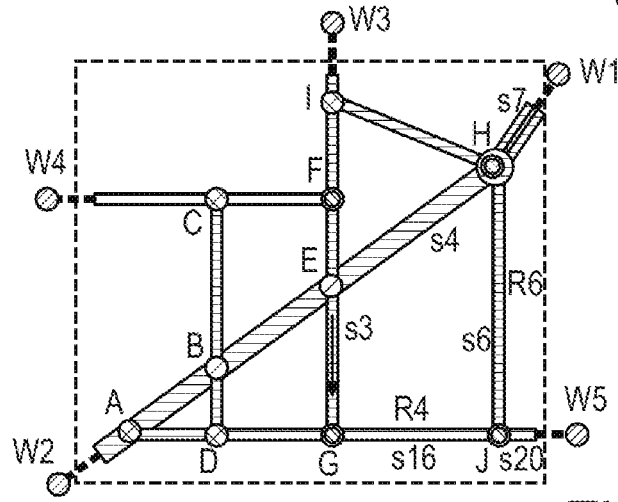
FIG. 7 shows a further schematic illustration of the graphic structure shown in FIG. 1.

If the action of the motor vehicle at the intersection E is as predicted, as shown in FIG. 6, the predicted driving route to the waypoint W1 is still the main route and nothing changes. If the action of the motor vehicle at the intersection E is not as predicted, as shown in FIG. 7, the predicted driving route to the waypoint W1 is not the main route and according to FIG. 7 is also not the driving route to the waypoint W3, which is among the most probable waypoints, then new calculations have to be carried out, wherein according to FIG. 7, the intersection E is now used as a starting point in the direction of intersection G. Probabilities for the waypoints are calculated along the driving routes from intersection E to each waypoint, and the waypoints having the highest probability (for example, W5 and W1) are taken into consideration for the calculation of the driving conditions.

Figure 8:
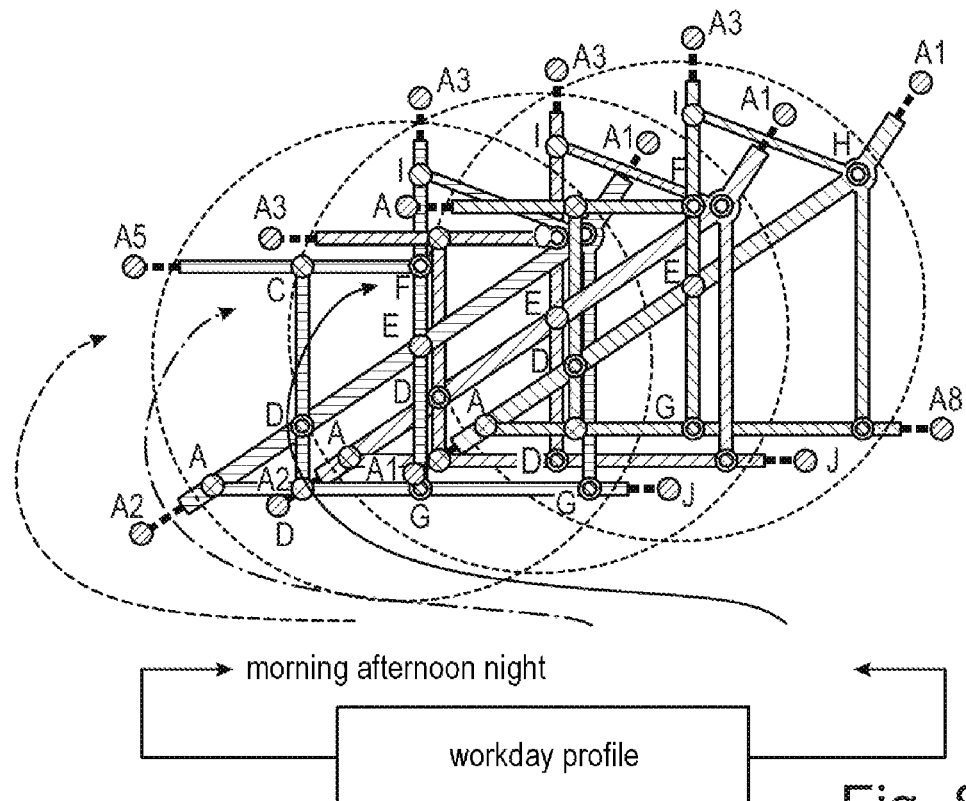
FIG. 8 shows a schematic illustration of a workday profile of the graphic structure shown in FIG. 1.
Figure 9:
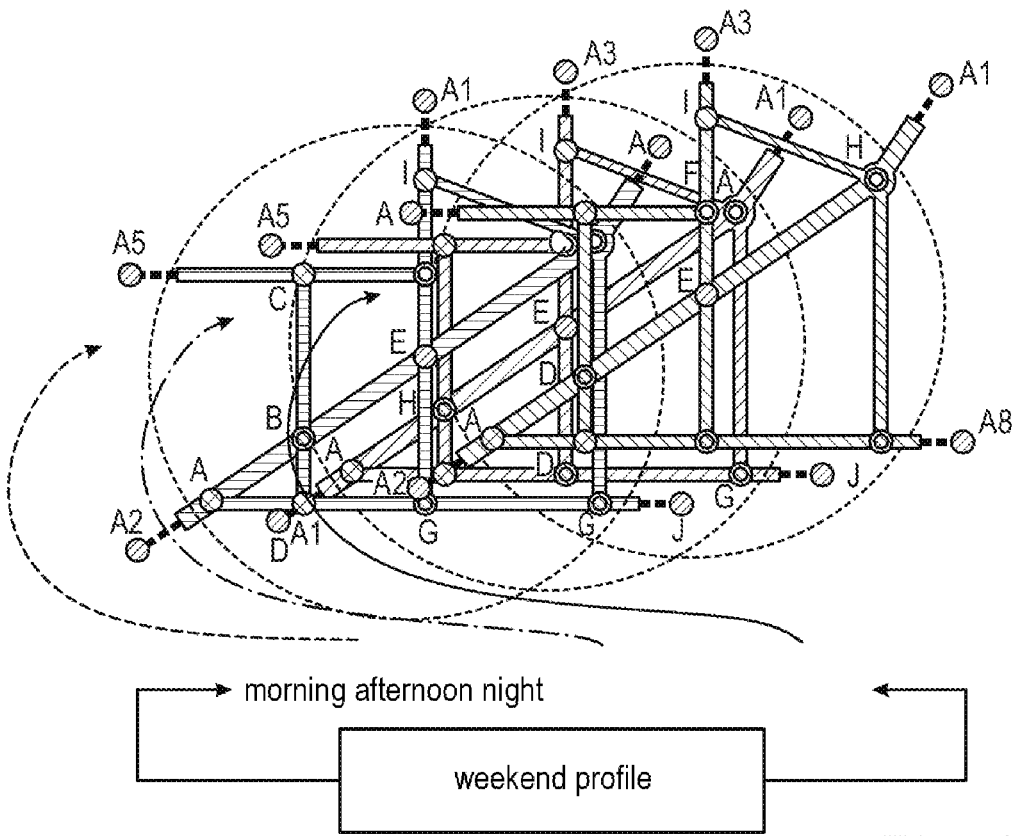
FIG. 9 shows a schematic illustration of a weekend day profile of the graphic structure shown in FIG. 1.

The described method can be applied in redundant form according to categories or profiles, which describe the driving behavior based on a set of relevant parameters $\overline{\alpha}$. For example, two main parameters can help in the preparation of categories, namely the main parameters "time of day" and "day of the week". However, this list is not exhaustive and further parameters can be taken into consideration, for example "month of the year", "vehicle type", and the like. Corresponding profiles of the method are shown in FIGS. 8 and 9.

A connected service level (cloud) can be provided. In this level, the items of information are based on fleet data, which are anonymous and without tracking of the individual driver behavior. The fleet data are used for the statistical characterization of the fleet and the preparation of fleet driving profiles:

profile$_{fleet}=f(\overline{\alpha},S(\theta))$

The characterization takes place on a global scale and a generalization takes place.

Moreover, a local service level (motor vehicle) can be provided. In this level, the items of information are based on the mapping of a set in profile_fleet by a transformation T, which contains vehicle data. In this way, the fleet profiling is refined by the transformation T in the same range as profile_fleet, whereby profile_vehicle is generated. This can be the case, for example, in a rental automobile or a motor vehicle used jointly by multiple users. The action domain is reserved to the motor vehicle, without feedback interaction with the cloud, and there is only the request of a new set profile_fleet from the cloud.

Furthermore, a personal service level (personal device) can be provided. In this level, a driver permits the interaction with profile_fleet and mapping T also takes place. In the last case, the intention of the driver (destination) can be known and the transformation T can relate to describing the selected driving route Rx for the coming horizons $H_{1 \ldots n}(W_{Rx})$. The interaction domain is reserved to the communication between motor vehicle and mobile personal device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for predicting travel of a vehicle comprising:
determining a prediction starting location and a plurality of prediction destinations, each destination representative of and corresponding to a discrete boundary intersection along a boundary, around the starting location, at a predefined distance horizon from the starting location;
determining, for each destination, at least one route to the destination from the starting location and crossing through the discrete intersection corresponding to a respective destination, resulting in a plurality of routes at least one of which corresponds to each destination, wherein the determining at least one route includes:
for each road intersection, within the predefined distance horizon, along a potential route between the starting location and a first destination, determining a statistical likelihood of the vehicle remaining on an intersection-exit that is along the potential route, wherein the statistical likelihood is determined based at least on an entry likelihood that the vehicle will be on the potential route leading into the road intersection and based on data indicating intersection-exits chosen by a plurality of other vehicles; and
selecting, from a plurality of potential routes to each destination, a route to each destination with a highest statistical likelihood, represented by an aggregate statistical likelihood that the vehicle remains on the potential route when passing through all road intersections along the route and within the predefined distance horizon;
selecting, from the selected routes to each destination, a most likely route having the highest statistical likelihood of the selected routes to each destination;
responsive to selecting the most likely route, automatically modifying a vehicle drive system control strategy in accordance with at least one predefined strategy for optimizing vehicle drive system behavior and accommodative of the most likely route as though the most likely route were a planned route; and
modifying control to at least one aspect of the vehicle drive system by engaging the modified vehicle drive system control strategy responsive to modification.

2. The method of claim 1, further comprising:
responsive to determining that the vehicle is within a predefined proximity to a prediction destination past which more than one possible route has not yet been determined:
setting the prediction destination as a new starting location;
determining a new plurality of prediction destinations each representative of and corresponding to new discrete boundary intersections, obtained based on map data, along a boundary, around the new starting location, at a new predefined distance horizon from the new starting location;
repeating the determining, for each destination, at least one route to the destination, treating the plurality of new prediction destinations as the destinations and the new distance horizon as the distance horizon, resulting in a plurality of new routes at least one of which corresponds to each new destination;
repeating the selection of the most likely route from the plurality of new routes, resulting in a most likely new route; and
responsive to selecting the most likely new route, repeating the automatically modifying the vehicle drive system control strategy accommodative of the most likely new route.

3. The method of claim 1, wherein the statistical likelihood of the vehicle remaining on the intersection-exit is further based on one or more of the intersection-exits chosen by a type of vehicle that corresponds to the vehicle, indicated by the data.

4. The method of claim 1, wherein the automatically modifying the vehicle drive system control strategy includes automatically scheduling regeneration of a particle filter based on a location, along the most likely route, having characteristics corresponding to characteristics predefined as suitable for particle filter regeneration.

5. The method of claim 1, wherein the automatically modifying the vehicle drive system control strategy includes automatically scheduling automatic battery regeneration for range extension, based on at least a portion of the most likely route having characteristics corresponding to characteristics predefined as suitable for battery regeneration while traveling.

6. The method of claim 1, further including:
observing the vehicle as it travels to determine if the vehicle is still on the selected most likely route; and
responsive to the vehicle no longer being on the selected most likely route, repeating the determining at least one route steps for at least one destination corresponding to the selected most likely route, to select at least one new route to the at least one destination.

7. The method of claim 6, further including, responsive to the vehicle no longer being on the selected most likely route and the selection of the at least one new route to the at least one destination, selecting a new most likely route from the selected routes to each destination, the new most likely route having a new highest statistical likelihood.

8. The method of claim 1, wherein a destination is chosen for every discrete boundary intersection with the boundary.

9. A non-transitory computer-readable storage medium storing instructions that, when executed, cause at least one processor to perform a method for predicting travel of a vehicle comprising:
determining a prediction starting location and a plurality of prediction destinations, each destination representative of and corresponding to a discrete boundary intersection along a boundary, around the starting location, at a predefined distance horizon from the starting location;
determining, for each destination, at least one route to the destination from the starting location, resulting in a plurality of routes at least one of which corresponds to each destination, wherein the determining at least one route includes:
for each road intersection, within the predefined distance horizon, along a potential route between the starting location and a first destination, determining a statistical likelihood of the vehicle remaining on an intersection-exit that is along the potential route, wherein the statistical likelihood is determined based at least on an entry likelihood that the vehicle will be on the potential route leading into the road intersection and based on data indicating intersection-exits chosen by a plurality of other vehicles; and
selecting, from a plurality of potential routes to each destination, a route to each destination with a highest statistical likelihood, represented by an aggregate statistical likelihood that the vehicle remains on the potential route when passing through all road intersections along the route and within the predefined distance horizon;
selecting, from the selected routes to each destination, a most likely route having the highest statistical likelihood of the selected routes to each destination;
responsive to selecting the most likely route, automatically modifying a vehicle drive system control strategy in accordance with at least one predefined strategy for optimizing vehicle drive system behavior and accommodative of the most likely route as though the most likely route were a planned route; and
modifying control to at least one aspect of the vehicle drive system by engaging the modified vehicle drive system control strategy responsive to modification.

10. The storage medium of claim 9, the method further comprising:
responsive to determining that the vehicle is within a predefined proximity to a prediction destination past which more than one possible route has not yet been determined:
setting the prediction destination as a new starting location;
determining a new plurality of prediction destinations each representative of and corresponding to new discrete boundary intersections, obtained based on map data, along a boundary, around the new starting location, at a new predefined distance horizon from the new starting location;
repeating the determining, for each destination, at least one route to the destination, treating the plurality of new prediction destinations as the destinations and the new distance horizon as the distance horizon, resulting in a plurality of new routes at least one of which corresponds to each new destination;
repeating the selection of the most likely route from the plurality of new routes, resulting in a most likely new route; and
responsive to selecting the most likely new route, repeating the automatically modifying the vehicle drive system control strategy accommodative of the most likely new route.

11. The storage medium of claim 9, wherein the statistical likelihood of the vehicle remaining on the intersection-exit is further based on one or more of the intersection-exits chosen by a type of vehicle that corresponds to the vehicle, indicated by the data.

12. The storage medium of claim 9, wherein the automatically modifying the vehicle drive system control strategy includes automatically scheduling regeneration of a particle filter based on a location, along the most likely route, having characteristics corresponding to characteristics predefined as suitable for particle filter regeneration.

13. The storage medium of claim 9, wherein the automatically modifying the vehicle drive system control strategy includes automatically scheduling automatic battery regeneration for range extension, based on at least a portion of the most likely route having characteristics corresponding to characteristics predefined as suitable for battery regeneration while traveling.

14. The storage medium of claim 9, the method further including:

observing the vehicle as it travels to determine if the vehicle is still on the selected most likely route; and responsive to the vehicle no longer being on the selected most likely route, repeating the determining at least one route steps for at least one destination corresponding to the selected most likely route, to select at least one new route to the at least one destination.

15. The storage medium of claim 14, the method further including, responsive to the vehicle no longer being on the selected most likely route and the selection of the at least one new route to the at least one destination, selecting a new most likely route from the selected routes to each destination, the new most likely route having a new highest statistical likelihood.

16. The storage medium of claim 9, wherein a destination is chosen for every discrete boundary intersection with the boundary.

* * * * *